United States Patent
Peters et al.

(10) Patent No.: US 8,244,915 B1
(45) Date of Patent: Aug. 14, 2012

(54) SYSTEMS AND METHODS TO UNIQUELY IDENTIFY ASSETS IN A FEDERATION

(75) Inventors: Robert J. Peters, Santa Monica, CA (US); Alexander A Kazerani, Santa Monica, CA (US)

(73) Assignee: Edgecast Networks, Inc., Santa Monica, CA (US)

( * ) Notice: Subject to any disclaimer, the term of this patent is extended or adjusted under 35 U.S.C. 154(b) by 0 days.

(21) Appl. No.: 13/427,183

(22) Filed: Mar. 22, 2012

Related U.S. Application Data

(63) Continuation of application No. 13/248,552, filed on Sep. 29, 2011, now Pat. No. 8,166,108, which is a continuation of application No. 13/234,015, filed on Sep. 15, 2011.

(60) Provisional application No. 61/524,294, filed on Aug. 16, 2011.

(51) Int. Cl.
*G06F 15/16* (2006.01)

(52) U.S. Cl. ......... 709/249; 709/203; 707/802; 707/821

(58) Field of Classification Search .................. 709/203, 709/249, 219, 220; 707/661, 802, 803, 821, 707/827
See application file for complete search history.

(56) References Cited

U.S. PATENT DOCUMENTS

| | | | |
|---|---|---|---|
| 6,108,703 A | 8/2000 | Leighton et al. | |
| 6,405,252 B1 | 6/2002 | Gupta et al. | |
| 6,442,551 B1 | 8/2002 | Ofek | |
| 6,502,125 B1 | 12/2002 | Kenner et al. | |
| 6,591,266 B1 | 7/2003 | Li et al. | |
| 6,795,868 B1 | 9/2004 | Dingman et al. | |
| 6,799,221 B1 | 9/2004 | Kenner et al. | |
| 7,111,057 B1 | 9/2006 | Sherman et al. | |
| 7,185,052 B2 | 2/2007 | Day | |
| 7,289,519 B1 | 10/2007 | Liskov | |
| 7,340,505 B2 | 3/2008 | Lisiecki et al. | |
| 7,562,153 B2 | 7/2009 | Biliris et al. | |
| 7,660,896 B1 | 2/2010 | Davis et al. | |
| 7,860,964 B2 * | 12/2010 | Brady et al. | .................. 709/223 |
| 7,925,782 B2 | 4/2011 | Sivasubramanian et al. | |
| 8,037,106 B2 * | 10/2011 | Barrenechea | .................. 707/803 |
| 8,117,306 B1 | 2/2012 | Baumback et al. | |
| 2002/0078233 A1 | 6/2002 | Biliris et al. | |
| 2002/0116444 A1 | 8/2002 | Chaudri et al. | |
| 2003/0093523 A1 | 5/2003 | Cranor et al. | |
| 2003/0115283 A1 | 6/2003 | Barbir et al. | |
| 2003/0229682 A1 | 12/2003 | Day | |
| 2005/0010653 A1 | 1/2005 | McCanne | |

(Continued)

*Primary Examiner* — Frantz Jean
(74) *Attorney, Agent, or Firm* — Los Angeles Patent Group; Arman Katiraei

(57) ABSTRACT

Some embodiments provide different frameworks that implement conflict avoidance systems and methods for ensuring uniqueness in identifying assets for different customers that are deployed to server capacity of one or more distributed platforms participating in a federation. Specifically, different frameworks are provided whereby the distributed platforms authorize use of a domain before configuring the domain to identify assets of a customer. A method performed in one such framework includes receiving a domain that is specified for identifying assets of a first customer belonging to a first distributed platform of the federation. The method determines whether the domain conflicts with a domain that is configured by a second distributed platform of the federation. The method then communicates with the first distributed platform (i) to configure the received domain when there is no conflict and (ii) to prevent the first distributed platform from configuring the received domain when there is a conflict.

25 Claims, 10 Drawing Sheets

U.S. PATENT DOCUMENTS

| | | |
|---|---|---|
| 2007/0120673 A1* | 5/2007 | Rajapakse et al. ......... 340/572.1 |
| 2007/0168517 A1 | 7/2007 | Weller et al. |
| 2007/0174442 A1 | 7/2007 | Sherman et al. |
| 2007/0250560 A1 | 10/2007 | Wein et al. |
| 2009/0055506 A1 | 2/2009 | Hudson et al. |
| 2009/0248893 A1 | 10/2009 | Richardson et al. |
| 2011/0029668 A1 | 2/2011 | Menai |
| 2011/0060812 A1 | 3/2011 | Middleton |
| 2011/0078230 A1 | 3/2011 | Sepulveda |
| 2011/0078327 A1 | 3/2011 | Li et al. |
| 2011/0131341 A1 | 6/2011 | Yoo et al. |
| 2011/0145386 A1 | 6/2011 | Stolorz et al. |
| 2011/0153327 A1* | 6/2011 | Iasso ............................ 704/243 |
| 2011/0258049 A1* | 10/2011 | Ramer et al. ................ 705/14.66 |

* cited by examiner

SYSTEMS AND METHODS TO UNIQUELY IDENTIFY ASSETS IN A FEDERATION

CLAIM OF BENEFIT TO RELATED APPLICATIONS

This application is a continuation of the United States nonprovisional patent application entitled "System and Methods to Uniquely Identify Assets in a Federation" filed on Sep. 29, 2011 and having been assigned Ser. No. 13/248,552, now U.S. Pat. No. 8,166,108, which is a continuation of the United States nonprovisional patent application entitled "System and Methods to Uniquely Identify Assets in a Federation" filed on Sep. 15, 2011 and having been assigned Ser. No. 13/234,015, which claims the benefit of U.S. provisional application 61/524,294, entitled "Open Content Delivery Network Platform with Capacity Exchange", filed Aug. 16, 2011. The contents of U.S. Pat. No. 8,166,108, nonprovisional application Ser. No. 13/234,015 and provisional application 61/524,294 are hereby incorporated by reference.

TECHNICAL FIELD

The present invention relates to a federation of independently operated distributed platforms and more specifically, to uniquely identifying assets in the federation.

BACKGROUND ART

Content delivery networks (CDNs) have greatly improved the way content is transferred across data networks such as the Internet. A CDN accelerates the delivery of content by reducing the distance that content travels in order to reach a destination. To do so, the CDN strategically locates surrogate origin servers, also referred to as caching servers or edge servers, at various points-of-presence (POPs) that are geographically proximate to large numbers of content consumers and the CDN utilizes a traffic management system to route requests for content hosted by the CDN to the edge server that can optimally deliver the requested content to the content consumer. Determination of the optimal edge server may be based on geographic proximity to the content consumer as well as other factors such as load, capacity, and responsiveness of the edge servers. The optimal edge server delivers the requested content to the content consumer in a manner that is more efficient than when origin servers of the content publisher deliver the requested content. For example, a CDN may locate edge servers in Los Angeles, Dallas, and New York. These edge servers may cache content that is published by a particular content publisher with an origin server in Miami. When a content consumer in San Francisco submits a request for the published content, the CDN will deliver the content from the Los Angeles edge server on behalf of the content publisher as opposed to the much greater distance that would be required when delivering the content from the origin server in Miami. In this manner, the CDN reduces the latency, jitter, and amount of buffering that is experienced by the content consumer. The CDN also allows the content publisher to offload infrastructure, configuration, and maintenance costs while still having the ability to rapidly scale resources as needed. Content publishers can therefore devote more time to the creation of content and less time to the creation of an infrastructure that delivers the created content to the content consumers.

As a result of these and other benefits, many different CDNs are in operation today. Edgecast, Akamai, Limelight, and CDNetworks are some examples of operating CDNs. Each of the CDNs today operates independently of one another. However, this independent operational model is less than ideal for the CDNs and the customers of the CDNs. The CDNs directly compete with one another to offer the same intrinsic services. To do so, the CDNs duplicate server capacity and infrastructure where other CDNs have already deployed server capacity and infrastructure. The independent operational model also affects customers because a first CDN may optimally deliver content to a first region and a second CDN may optimally deliver content to a second region and a customer operating in both the first and second regions is forced to choose between the two CDNs or is forced to incur additional costs in obtaining services of both CDNs.

CDN federation is advocated by EdgeCast Networks Inc. of Santa Monica, Calif. as a way to address these existing shortcomings and also as a way to provide dynamic CDN scalability, provide a larger global CDN footprint, and increase utilization of a CDN operator's server capacity by making some or all of that server capacity available to multiple CDN service providers who then, in turn, can realize advantages of a CDN without the need to develop the optimized software and without the need to deploy the infrastructure necessary for a CDN. It is envisioned that CDNs participating in the federation can exchange server capacity with one another such that CDNs with excess server capacity can avoid the sunk costs associated with server capacity going unused by selling that server capacity to CDNs that are in need of additional server capacity. The server capacity sold by a CDN seller can then be configured and used by a CDN buyer to serve assets for at least one of its customers. In this manner, a customer's asset can be served using server capacity of two or more independently operated CDNs. It is further envisioned that participants in the federation can continue to independently manage and operate their networks with minimal change required to participate in the federation.

The CDN interoperation envisioned for the federation introduces issues and complexities that are not readily addressable with existing systems of the federation participants. One such issue is how to uniquely identify assets of customers that have been deployed to server capacity of different federation participants as a result of capacity sharing. Even though each CDN can manage how assets for its customers are identified within its internal platform, once an asset is deployed from a first CDN to a second CDN, the identification used by the first CDN to identify the asset may conflict with the identification the second CDN uses to identify an asset for a different customer. Conflicting identification of different assets that are deployed to the same CDN can result in delivery of the wrong asset or failed delivery of the asset.

To enable the envisioned federation, systems and methods are needed to permit interoperation between the independently operated CDNs that participate in the federation. As part of the interoperation, systems and methods are needed to uniquely identify different assets that are deployed to server capacity of different federation participants.

SUMMARY OF THE INVENTION

It is an object of the embodiments described herein to uniquely identify assets for different customers that have their assets deployed to one or more distributed platforms participating in a federation. It is further an object to ensure the unique identification of assets across the federation while enabling the distributed platforms to configure custom domains for use in identifying the assets of different customers irrespective of which servers of which distributed platforms the assets for the different customers are to be deployed to. In some embodiments, the federation is the Open CDN platform conceived by Edgecast Networks Inc. and the federation participants include content delivery networks (CDNs) and other service providers or operators of distributed platforms.

To achieve these and other objects, some embodiments provide different frameworks that implement conflict avoidance systems and methods for ensuring uniqueness in identifying assets for different customers, where the assets are deployed to server capacity of one or more distributed platforms participating in the federation. Specifically, different frameworks are provided whereby the distributed platforms authorize use of a domain before configuring the domain to identify assets of a customer. Authorization determines whether a domain specified for identifying assets of a first customer does not conflict with domains that have been already configured for use in identifying assets of other customers. Some embodiments perform granular authorization whereby the same domain may be authorized for use in identifying assets of two different customers when the assets of the customers are deployed to server capacity of different distributed platforms participating in the federation.

In a first framework, a central conflict avoidance server is provided to authorize which domains may be configured for identifying assets of which customers. Before configuring the requested domain for use in identifying assets of a customer, each distributed platform confirms with the conflict avoidance server that a requested domain is not conflicting with other domains already configured by the distributed platforms.

In a second framework, one of the distributed platforms participating in the federation is designated to host the conflict avoidance server and thereby perform domain authorization for the other distributed platforms participating in the federation. In a third framework, domain authorization is performed in a distributed manner whereby the administrative servers of each of the distributed platforms participating in the federation authorize configuration of a domain for assets that are to be deployed to server capacity of that distributed platform. In a fourth framework, each distributed platform maintains a database for tracking the domains that have been configured for use in identifying assets deployed to that distributed platform and an authorization broker is provided to perform authorization on behalf of a requesting distributed platform.

BRIEF DESCRIPTION OF THE DRAWINGS

In order to achieve a better understanding of the nature of the present invention, preferred embodiments for the various frameworks for uniquely identifying assets in a federation of independently operated distributed platforms will now be described, by way of example only, with reference to the accompanying drawings in which.

DETAILED DESCRIPTION

Figure 1:
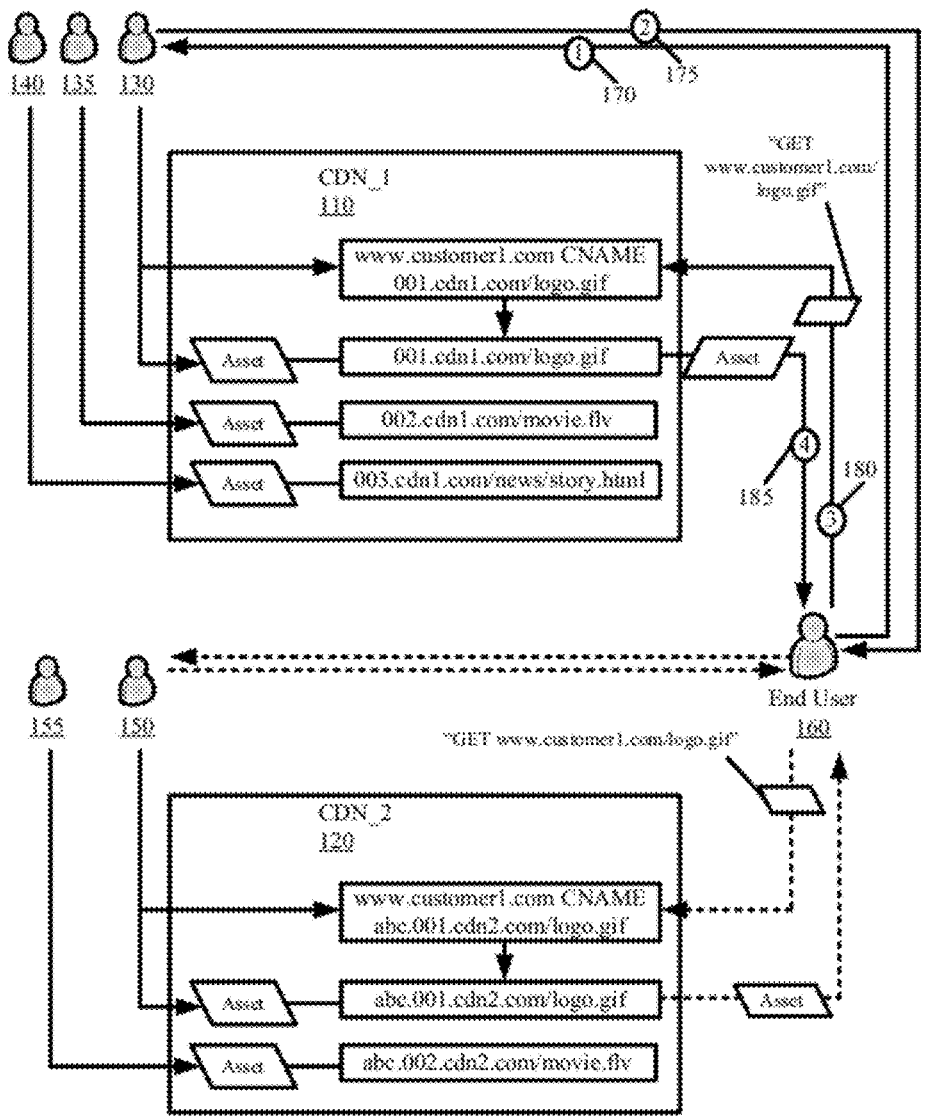
FIGS. 1 and 2 conceptually illustrate the potential conflict that arises when an asset for a customer of a first federation participant is deployed to server capacity of a second federation participant as a result of federation capacity sharing.

In the following detailed description, numerous details, examples, and embodiments for various frameworks to uniquely identify assets in a federation of independently operated distributed platforms are set forth and described. As one skilled in the art would understand in light of the present description, these frameworks are not limited to the embodiments set forth, and these frameworks may be practiced without some of the specific details and examples discussed. Also, reference is made to the accompanying figures, which illustrate specific embodiments in which the frameworks can be practiced. It is to be understood that other embodiments can be used and structural changes can be made without departing from the scope of the embodiments herein described.

Various terms are defined to aid in the discussion below. The term federation refers to the interoperation of multiple independently operated distributed platforms that interoperate by exchanging capacity with one another such that a first distributed platform with excess capacity can make its excess capacity available for a fee or other exchange terms to a second distributed platform that is need of additional capacity. One example of a federation is the Open CDN platform that is conceived by Edgecast Networks Inc. of Santa Monica, Calif. and that is further described in the U.S. provisional patent application 61/524,294 entitled "Open Content Delivery Network Platform with Capacity Exchange", filed Aug. 16, 2011.

The term federation participant is used to describe a distributed platform that participates in the federation by (1) making its unused capacity available for other participants to purchase, (2) acquiring capacity from another participant, or (3) deploying assets to servers of another participant. A distributed platform need not participate in the federation at all times (by buying, selling, or deploying assets) to be a federation participant. Federation participants can include any content delivery network (CDN) operator, any CDN service provider, any provider of hosting, caching, or cloud services, and any operator or service provider of a set of distributed servers. Some examples of federation participants include CDNs such as Edgecast, Akamai, Limelight, CDNetworks, and Minor Image. Other examples of federation participants include Amazon CloudFront, Amazon EC2, AT&T, and Web.com.

The term domain refers to a domain name for identifying assets throughout the Internet, and more specifically, for identifying assets that are deployed to server capacity of the different federation participants. Domain names are used in conjunction with the Domain Name System (DNS) to resolve to Internet Protocol (IP) addresses that address the assets. As used herein, domains may be comprised of a hierarchy of domains including top-level domains, lower level domains, and sub-domains. Domains may also include hostnames or fully qualified domain names. Some examples of domains as used herein include "customer.com", "images.customer.com", "fms.customer1.1234.cd1.net", and any other combination of domains, sub-domains, and hostnames.

The term asset refers to a resource containing data that is produced by any content provider that is a customer of a federation participant. The asset may by HyperText Transfer Protocol (HTTP) content, video, audio, images, text, scripts, and other content that is presentable or executable over a digital interface. By virtue of the capacity sharing provided by the federation, an asset can be deployed by a first federation participant to server capacity of a second federation participant. Capacity sharing refers to the ability for the first federation participant to acquire some amount of server capacity from the second federation participant via the capacity exchange of the Open CDN platform described in the provisional patent application 61/524,294 or other trading or brokering mechanism that is envisioned for the federation. Deploying the asset then relates to the ability for the first federation participant to configure the acquired server capacity such that the asset of a customer belonging to the first federation participant is wholly or partially served using the acquired server capacity of the second federation participant. Configuring server capacity refers to configuring resources of one or more servers that are operated by a particular distributed platform to serve assets to end users that request those assets. It should be apparent that the federation via capacity sharing allows the first federation participant (1) to offload the serving of a customer's asset such that the asset is served to requesting end users wholly from server capacity of the second federation participant, (2) to partially offload the serving of a customer's asset such that the asset is served to requesting end users from servers that are operated by the first federation participant and the second federation participant, or (3) to partially offload the serving of a customer's asset such that the asset is served to requesting end users from servers of the second federation participant and servers of a third federation participant.

Capacity sharing, however, brings about issues for how to uniquely identify assets that are deployed by a first federation participant to server capacity of at least a second federation participant. When a federation participant independently operates, it is able to control how the assets of its customers are identified. Ordinarily, a federation participant ensures unique identification for its customers' assets by assigning a unique domain name to each customer that is then used as part of a Uniform Resource Locator (URL) to uniquely identify the location or assets for each of the customers. The unique domain name, also referred to herein as a CDN domain, refers to a domain name that is assigned to a customer of a particular federation participant. "fms.xyz.fedparticipantcdn.net/00xyz" is an example of a CDN domain, with "fms" representing a service type, "xyz" representing a unique account number that is assigned to a customer of the particular federation participant "fedparticipantcdn.net", and "00xyz" representing a content access point that is a point of reference to an origin server that may be operated by the particular federation participant or the customer. It should be apparent that different federation participants may assign differently formatted CDN domains to their respective customers with additional or fewer prefixes for the assigned domain. The URL identifies a location or an asset of the customer using the assigned CDN domain. For example, the URL "http://fms.xyz.fedparticipantcdn.net/00xyz/news/2011/index.html" identifies "http" as the protocol, "fms" as the service type, "xyz" as the customer, "fedparticipantcdn.net" as the federation participant (i.e., CDN), "00xyz" as the content access point, and "news/2011/index.html" as the path for identifying the location of the "index.html" asset. It should be apparent that the URL can include more or less parameters such as query strings and additional directories in the path as some examples.

To make the identification of a location or asset more user-friendly, many federation participants provide what is referred to herein as an "edge canonical name" or "edge CNAME". The edge CNAME is used to mask the assigned CDN domain to a more user-friendly domain. The edge CNAME usually allows a customer to specify a custom domain for identifying a location or assets of the customer. For example, an edge CNAME domain can be used to mask the CDN URL "http://fms.xyz.fedparticipantcdn.net/00xyz/news/2011/index.html" to "http://www.mydomain.com/news/2011/index.html" with the domain "www.mydomain.com" serving as an alias to the assigned CDN domain "fms.xyz.fedparticipant.net/00xyz". The edge CNAME contains a CDN aspect and a Domain Name System (DNS) aspect. The CDN aspect involves a configuration for the federation participant that allows its servers to identify a location or an asset based on the specified domain for the edge CNAME. Continuing the above example, if a server of the CDN receives an asset request for "www.mydomain.com/news/2011/story1.html", the server knows that the request is actually for an asset of the customer assigned to CDN domain "fms.xyz.fedparticipantcdn.net/00xyz/" and the correct asset "story1.html" is then served. If a directory path has been specified, a further configuration modification may automatically rewrite the URL to point to the appropriate folder. In the above example, a URL rewrite rule may be specified such that a request for "www.mydomain.com/2011/movie.flv" is automatically rewritten to "fms.xyz.fedparticipant.net/00xyz/movies/2011/movie.flv". The DNS aspect requires that a DNS server of the customer be configured to recognize the alias for the CDN URL. This usually includes insertion of a CNAME record to the DNS server of the customer. By using the edge CNAME, end user requests for the customers' assets can then be made to point to the domain that is custom specified for the edge CNAME instead of the more verbose CDN domain.

When a customer of a particular federation participant specifies a domain to use in conjunction with an edge CNAME, the particular federation participant performs a conflict avoidance check to ensure that no other assets for customers of the particular federation participant are identified using the same domain. Otherwise, when the same domain is used to identify assets for different customers, a conflict arises that could result in a server serving the asset of the wrong customer or failing to serve the requested asset.

The ability to share capacity and the ability to deploy assets for a customer of a first federation participant to server capacity of a second federation participant renders the independent conflict avoidance checks performed by each of the federation participants deficient for ensuring unique identification of assets across the federation. This is because each federation participant is only aware of the domains it has configured for identifying assets of its native customers. A first federation participant cannot ensure that a domain configured to uniquely identify a first asset of a first customer will not conflict with a domain configured by a second federation participant to identify a second asset of a different customer when the first asset is to be deployed to server capacity of the second federation participant.

Figure 2:
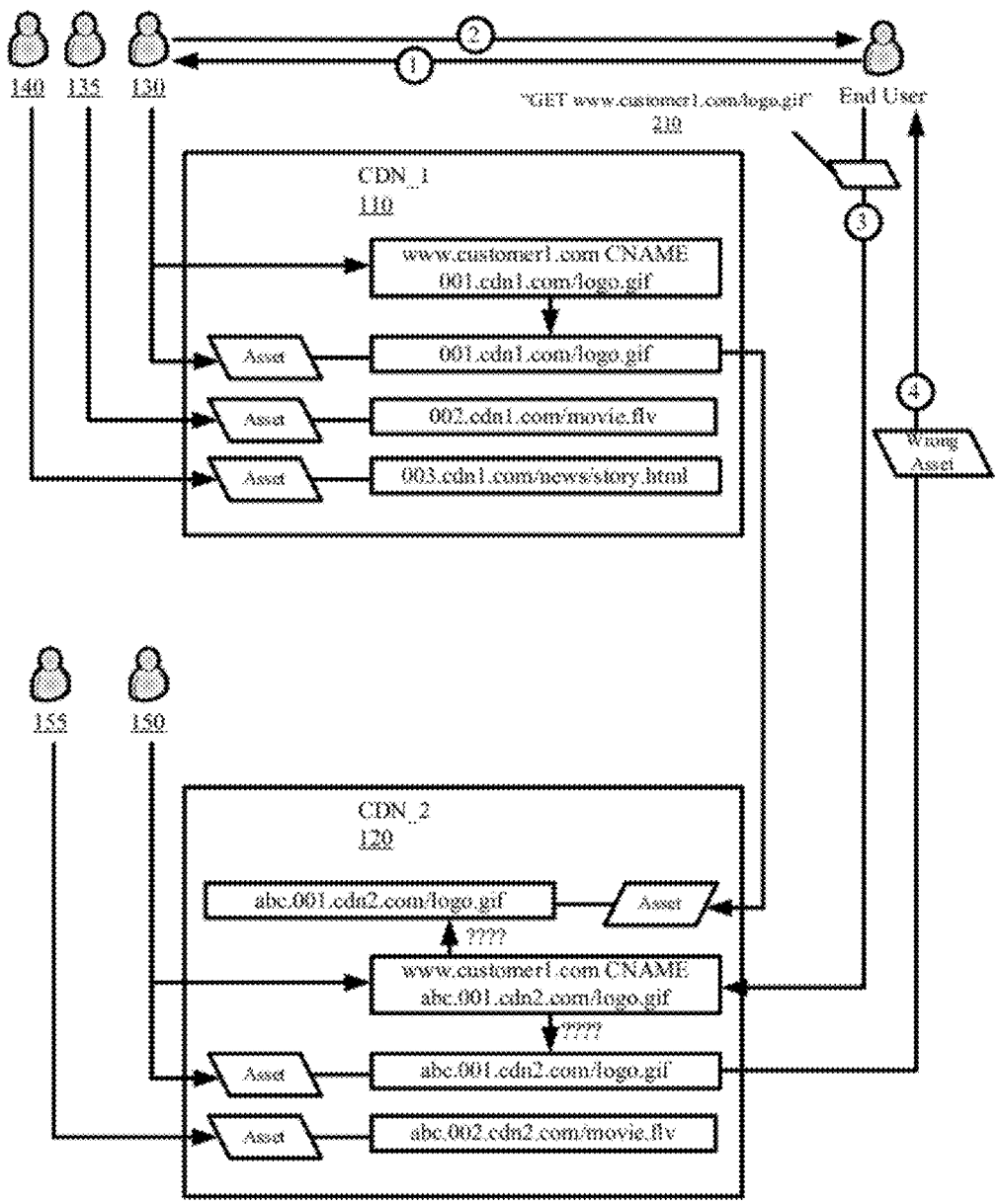

FIGS. 1 and 2 conceptually illustrate the potential conflict that arises when an asset for a customer of a first federation participant is deployed to server capacity of a second federation participant as a result of federation capacity sharing. FIGS. 1 and 2 illustrate two CDNs 110 and 120 that participate in the federation. The first CDN federation participant 110 assigns the CDN domains "001.cdn1.com", "002.cdn1.com", and "003.cdn1.com" to uniquely identify assets for each of three customers 130, 135, and 140 internally across servers that are operated by the first CDN federation participant 110. The second CDN federation participant 120 assigns the CDN domains "abc.001.cdn2.com" and "abc.002.cdn2.com" to uniquely identify assets for each of two customers 150 and 155 internally across servers that are operated by the second CDN federation participant 120. Customer 130 of the first CDN federation participant 110 configures an edge CNAME with the domain "www.customer1.com" to serve as an alias to the first CDN federation participant 110 assigned CDN domain "001.cdn1.com". Customer 150 of the second CDN federation participant 120 also configures an edge CNAME with the same domain "www.customer1.com" serving as an alias to the second CDN 120 assigned CDN domain "abc.001.cdn2.com".

In FIG. 1, assets of the customer 130 can be requested using either the custom domain "www.customer1.com" or the CDN assigned domain "001.cdn1.com", because the assets are strictly deployed to server capacity of the first CDN federation participant 110. Similarly, assets of the customer 150 can be requested using either the custom domain "www.customer1.com" or the CDN assigned domain "abc.001.cdn2.com", because the assets are strictly deployed to server capacity of the second CDN federation participant 120. In summary, there is no conflict as a result of the same domain being used to identify different customer assets because the assets are deployed to server capacity of different federation participants. The lack of conflict is illustrated by the end user 160 submitting (at 170) an HTTP GET request to request the asset "http://www.cusomter1.com/logo.gif" from the customer 130 of the first CDN federation participant 110. The customer 130 (via DNS resolution) points (at 175) the request to the first CDN federation participant 110. The request is then submitted (at 180) to the first CDN federation participant 110. The first CDN federation participant 110 contains a single non-conflicting edge CNAME configuration that aliases the www.customer1.com domain specified in the request to 001.cdn1.com and the logo.gif asset for the customer 130 is then delivered (at 185) to the requesting end user. Similarly, when the end user 160 submits an HTTP GET request to request the asset "http://www.cusomter1.com/logo.gif" from the customer 150 of the second CDN federation participant 120, the customer 150 (via DNS resolution) points the request to the second CDN federation participant 120. The request is then submitted to the second CDN federation participant 120. The second CDN federation participant 120 contains a single non-conflicting edge CNAME configuration that aliases the www.customer1.com domain specified in the request to abc.001.cdn2.com and the logo.gif asset for the customer 150 is then delivered to the requesting end user.

In FIG. 2, the first CDN federation participant 110 acquires some capacity of the second CDN federation participant 120 (via the capacity exchange of the Open CDN platform) and the asset for customer 130 is deployed to the servers of the second federation participant 120. As a result, the duplicate usage of the "www.customer1.com" domain will produce conflict in the second CDN federation participant 120. In this figure, the assets of customers 130 and 150 are no longer uniquely identified as both customers 130 and 150 utilize the same domain as an alias to identify different assets at the second CDN federation participant 120. This can result in the incorrect asset being delivered or failed delivery of the requested asset. As shown, an HTTP GET request 210 for the asset "GET http://www.customer1.com/logo.gif" pointed to the second CDN federation participant 120 by either the customer 130 or the first CDN federation participant 110 may result in the logo.gif asset of the customer 150 being delivered to the requesting end user, instead of the logo.gif asset of the customer 130 being delivered. This is because the second CDN federation participant 120 has configured the www.customer1.com domain to alias to the abc.001.cdn2.com CDN domain and not the 001.cdn1.com domain. Overwriting or updating the configuration of the second CDN federation participant 120 to alias the www.customer1.com domain to the 001.cdn1.com domain will then cause only the asset for customer 130 to be served by servers of the second CDN federation participant 120 and the asset for customer 150 will no longer be served.

To alleviate these and other issues relating to the unique identification of assets across a federation of distributed platforms, some embodiments provide different frameworks that implement conflict avoidance systems and methods for uniquely identifying the assets that have been deployed to server capacity of one or more federation participants. More specifically, the frameworks ensure that when a distributed platform configures a domain alias as part of an edge CNAME to identify assets of a particular customer, that the configured domain has not already been configured for use in identifying assets of another customer of the federation. In some embodiments, the frameworks prevent the same domain from being configured for use in identifying assets of any two customers of distributed platforms participating in the federation. In some embodiments, the frameworks prevent the same domain from being configured for use in identifying assets of two customers when the assets are deployed to server capacity of the same one or more distributed platforms. In some such embodiments, the same domain can still be used to uniquely identify assets of different customers when the assets of the customers are deployed to server capacity of non-conflicting distributed platforms (similar to the scenario presented with reference to FIG. 1). In still some other embodiments, the frameworks identify that a same domain has been configured for use in identifying assets of two different customers and the frameworks cause the servers deployed with the assets to ignore or otherwise prevent the configuration for one of the customers from impacting the operation of the other configuration.

Figure 3:
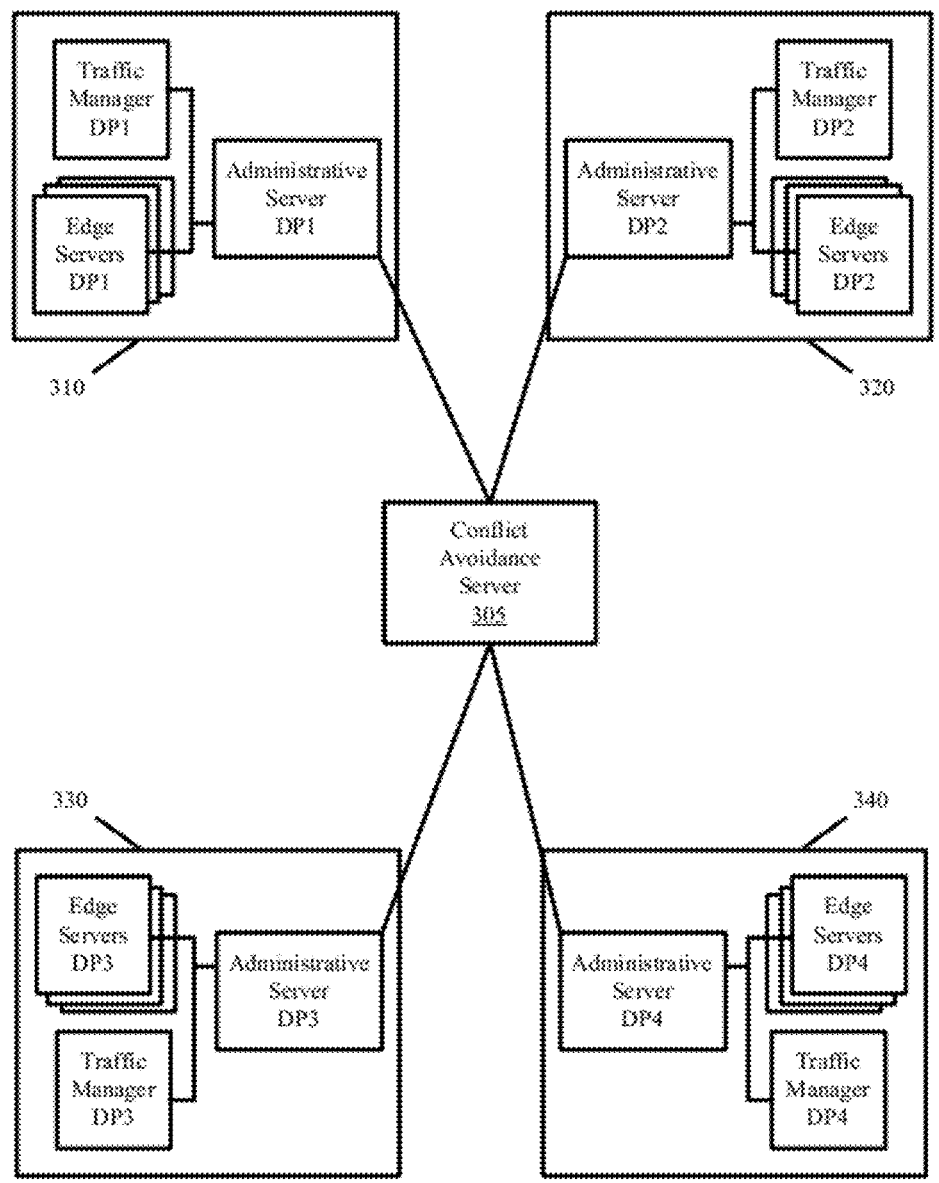
FIG. 3 presents a first conflict avoidance framework in accordance with some embodiments for ensuring unique identification of assets across the federation.

FIG. 3 presents a first conflict avoidance framework in accordance with some embodiments for ensuring unique identification of assets across the federation. The framework of FIG. 3 illustrates a conflict avoidance server 305 and four distributed platforms 310, 320, 330, and 340. Each distributed platform 310, 320, 330, and 340 independently operates a set of servers. The sets of servers are used to serve assets to different end users that request the assets.

Each set of servers may include caching, mirroring, streaming, or processing servers as some examples. Each distributed platform 310, 320, 330, and 340 is also illustrated with a traffic management service and an administrative server. Though a single administrative server is shown for each distributed platform, it should be apparent that each administrative server may be representative of multiple physical or virtual servers that operate to provide the functionality that is described herein.

The traffic management service may be implemented using any set of DNS servers or other traffic management system (e.g., Anycast routing). The traffic management service routes requests for assets to the server that can optimally serve the assets. In some embodiments, the traffic management service may identify the optimal server for a specific asset request from the sets of servers of first and second federation participants when the asset is deployed to those sets of servers.

The administrative server performs the command and control functions (configuration, monitoring, reporting, etc.) for the distributed platform. In the federation, the administrative servers are communicably coupled to one another using a static or dynamic Internet based connection that is preferably secured or encrypted. The coupling and the intercommunication resulting from the coupling enables capacity sharing (i.e., buying, selling, and configuring of capacity) and enables the ability to deploy assets to server capacity of one or more foreign distributed platforms (i.e., federation participants). In some embodiments, the intercommunication is enabled by an Open CDN application programming interface (API) and/or connector agent that is integrated with each distributed platform. Core functions for the traffic management service, administrative server, Open CDN API, and connector agent are further described in the referenced provisional patent application 61/524,294.

In the framework of FIG. 3, the administrative servers are also communicably coupled to the conflict avoidance server 305 using a dynamic or static connection that is preferably secure or encrypted. The administrative servers are configured to utilize the coupled connection to the conflict avoidance server 305 to authorize configuration of a domain. Authorization prevents the same domain from being configured when that domain is to be used as an alias to identify assets for different customers that are deployed to the same distributed platform. In some embodiments, the conflict avoidance server 305 allows the same domain to be configured to identify assets for different customers when the assets for each customer are deployed to server capacity of different distributed platforms. In some embodiments, the conflict avoidance server 305 includes a database that stores the domains that have been configured for customers of the distributed platforms 310, 320, 330, and 340. By referencing the database when an administrative server submits a request to configure a domain, the conflict avoidance server 305 can determine whether the domain will or will not conflict with already configured domains.

Figure 4:
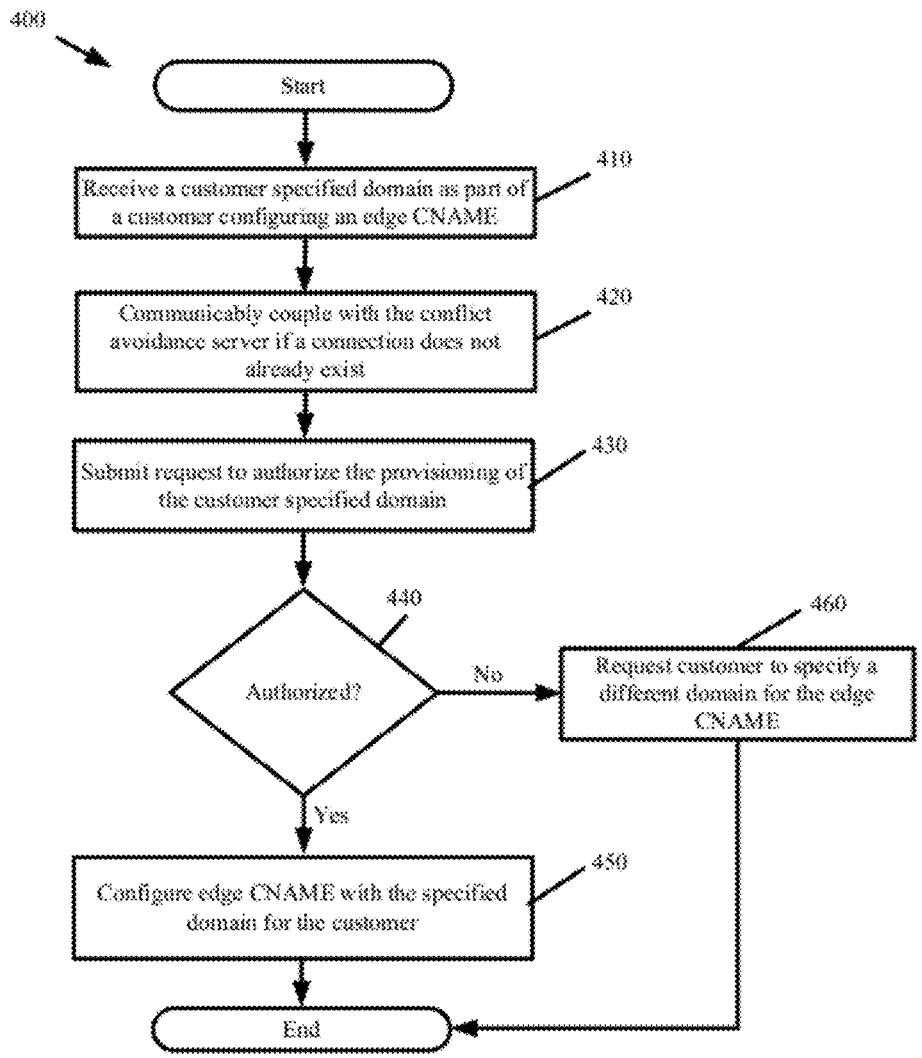
FIG. 4 presents a process performed by an administrative server of a distributed platform operating in the framework of FIG. 3 to authorize configuration of a domain for use in identifying assets that are deployed to server capacity of one or more distributed platforms participating in the federation in accordance with some embodiments.

Authorization is typically performed at the time a customer of one of the distributed platforms 310, 320, 330, or 340 attempts to configure an edge CNAME with a custom domain. FIG. 4 presents a process 400 performed by an administrative server of a distributed platform operating in the framework of FIG. 3 to authorize configuration of a domain for use in identifying assets that are deployed to server capacity of one or more distributed platforms participating in the federation in accordance with some embodiments.

The process 400 begins by receiving (at 410) a customer specified domain as part of a customer configuring an edge CNAME. The process communicably couples (at 420) with the conflict avoidance server 305 if a connection does not already exist between the administrative server and the conflict avoidance server 305. In some embodiments, each administrative server is configured with the protocols and credentials needed to communicably couple with the conflict avoidance server 305. Through the established connection, the process submits (at 430) a request to authorize the configuration of the customer specified domain. In some embodiments, the request also identifies which servers or which distributed platforms the asset that is to be identified by the specified domain will be deployed to. This additional information allows the conflict avoidance server 305 to perform more granular authorization. Specifically, the conflict avoidance server 305 can authorize the same domain to be used to identify assets of different customers when the assets for each customer are deployed to server capacity of different distributed platforms. The request may be encapsulated in any Internet Protocol (IP) packet.

The process then awaits (at 440) a response from the conflict avoidance server 305. If in the response the conflict avoidance server 305 authorizes the configuration of the specified domain, the process configures (at 450) the edge CNAME with the specified domain for use in uniquely identifying the assets of a particular customer. The particular customer is optionally requested to make any necessary configuration changes to its DNS servers and the process ends. If in the response the conflict avoidance server 305 prevents the specified domain from being configured, the process requests (at 460) the customer to specify a different domain for the edge CNAME and the process restarts with the new domain or the process ends.

In some embodiments, the process 400 is modified by having the administrative server perform an internal uniqueness determination for the customer specified domain before performing the steps 420-460. Specifically, the administrative server first determines that the customer specified domain received at 410 is internally unique with respect to domains that the administrative server has already configured for identifying assets of other customers in the same distributed platform. Should the customer specified domain be unique within the distributed platform of the administrative server, then the administrative server performs steps 420-460 of process 400.

Figure 5:
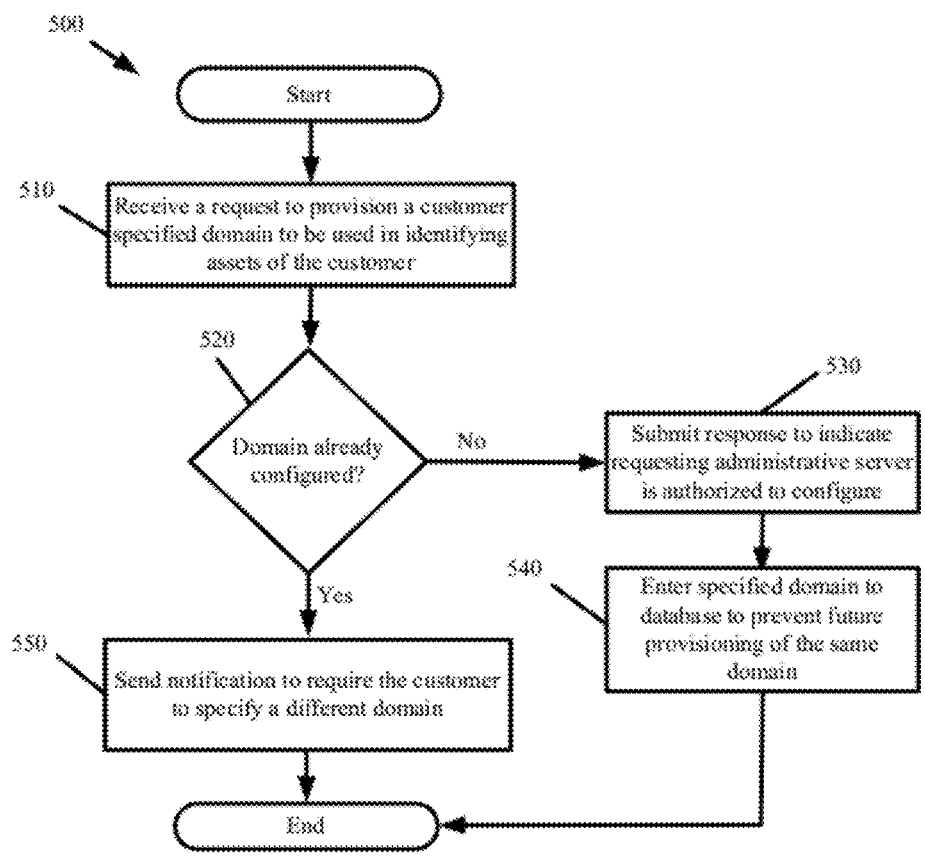
FIG. 5 presents a process performed by the conflict avoidance server operating in the framework of FIG. 3 to authorize domain configuration in accordance with some embodiments.

FIG. 5 presents a process 500 performed by the conflict avoidance server 305 operating in the framework of FIG. 3 to authorize domain configuration in accordance with some embodiments. The process 500 begins by receiving (at 510) from an administrative server of a distributed platform participating in the federation, a request to configure a specified domain for use in identifying assets of a particular customer. As noted above, the request may optionally identify which servers or which distributed platforms the asset identified by the specified domain will be deployed to.

The process determines (at 520) whether the received domain is already configured for use by another customer of at least one distributed platform that participates in the federation. To perform the determination, the process compares the specified domain in the submitted request with domains that have already been configured and that are entered to the conflict avoidance server's database. In some embodiments, the determination at step 520 is more granular. Specifically, the process determines whether the assets that are identified by the received domain are to be deployed to the same distributed platform that already has the specified domain configured for use in identifying assets of a different customer. Accordingly, there is no conflict for the more granular determination when the same domain is used to identify assets of different customers that are deployed to different distributed platforms.

If the specified domain has not yet been configured, the process authorizes (at 530) the requesting administrative server to configure the domain by submitting a response so indicating to the administrative server. The process enters (at 540) the specified domain to its database to prevent future configuration of the same domain for use in identifying assets of another customer and the process ends. Otherwise, a notification is sent (at 550) to the administrative server to require the particular customer to specify a different domain and the process ends.

In some embodiments of the framework of FIG. 3, the conflict avoidance server 305 passively monitors domains that are configured by the various federation participants. In some such embodiments, the conflict avoidance server 305 does not actively prevent a domain from being configured to identify assets of different customers. However when a conflict is detected, the conflict avoidance server 305 disables the latter specified configuration from taking effect in the distributed platforms that the configuration creates conflict in. This may include communicating with the administrative server or servers of the distributed platform in which the conflict occurs to cause the administrative server or servers to ignore or otherwise disable the latter specified configuration. In some embodiments, the latter specified configuration is ignored or otherwise disabled by modifying routing functions of the traffic management servers for the distributed platform in which the conflict occurs to redirect, ignore, or submit error messages to end users that request assets identified by the latter specified domain. A notification may then be provided to the customer to take further action to remediate the conflict.

Figure 6:
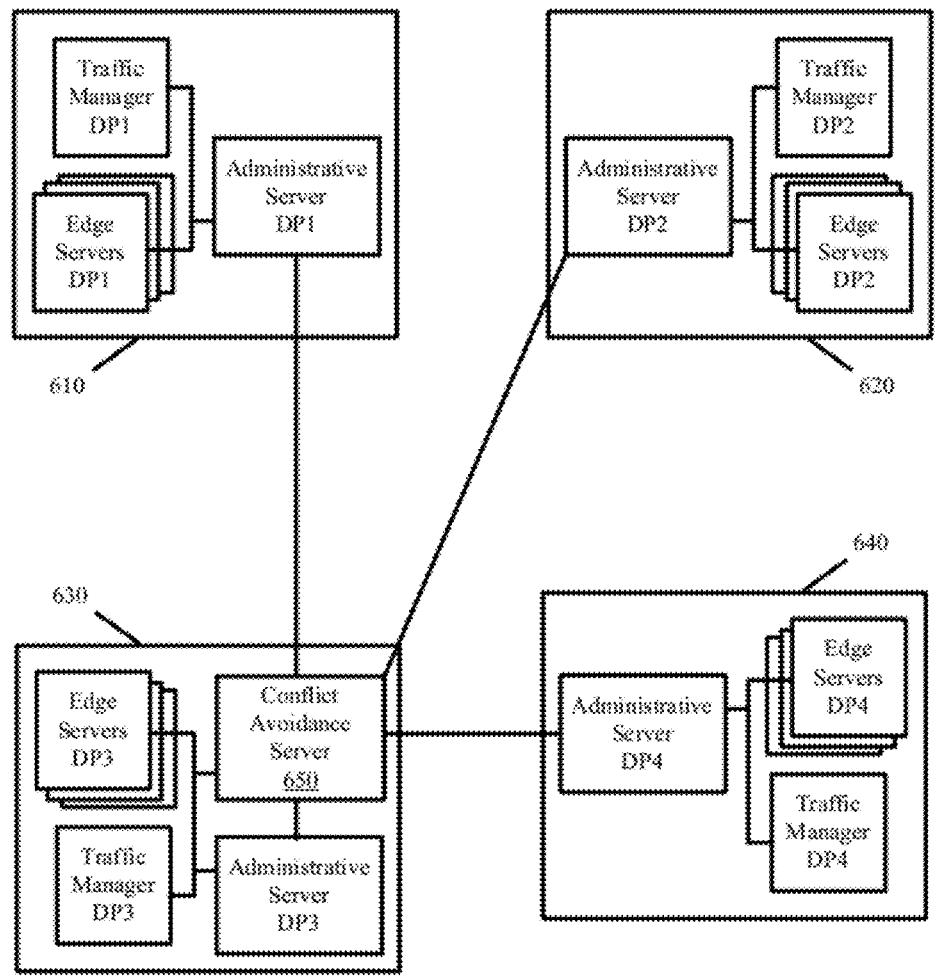
FIG. 6 presents a second conflict avoidance framework in accordance with some embodiments for ensuring unique identification of assets across the federation.

FIG. 6 presents a second conflict avoidance framework in accordance with some embodiments for ensuring unique identification of assets across the federation. In this framework, the distributed platform 630 is designated to host the conflict avoidance server 650 and thereby perform domain authorization for the other distributed platforms 610, 620, and 640. Though the conflict avoidance server 650 is shown separate from the administrative server of the distributed platform 630, it should be apparent that the functionality of the two servers may be integrated and performed by a single machine or performed by a single component of the distributed platform 630. The administrative servers for the distributed platforms 610, 620, and 640 are configured to perform domain authorization with the conflict avoidance server 650 and are therefore communicably coupled to the conflict avoidance server 650. In this framework, the conflict avoidance server 650 is no longer independently operated by the federation, but is instead operated by one of the distributed platforms participating in the federation.

Figure 7:
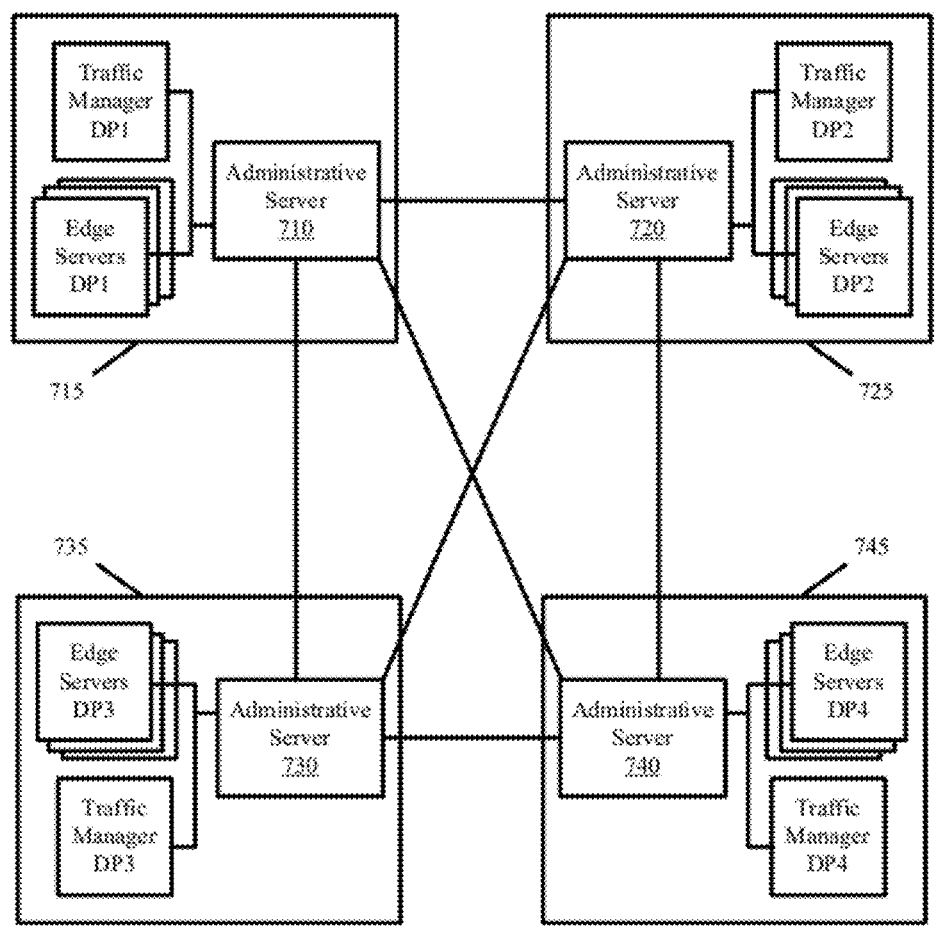
FIG. 7 presents a third conflict avoidance framework in accordance with some embodiments for ensuring unique identification of assets across the federation.

FIG. 7 presents a third conflict avoidance framework in accordance with some embodiments for ensuring unique identification of assets across the federation. In this framework, the function of the conflict avoidance server is performed collectively by the administrative servers 710, 720, 730, and 740 of the distributed platforms 715, 725, 735, and 745. The administrative servers 710, 720, 730, and 740 are communicably coupled to one another and each administrative server 710, 720, 730, and 740 is configured to authorize configuration of a domain with the other administrative servers in a distributed fashion. In some embodiments, the authorization is more selective in that an administrative server authorizes configuration for a domain with only the other administrative servers of the distributed platforms to which the asset identified by the domain is to be deployed.

Each administrative server 710, 720, 730, and 740 maintains a database for the domains that have already been configured for identifying assets deployed to the distributed platform in which the administrative server operates. This includes assets for customers that are native and/or foreign to the distributed platform.

Figure 8:
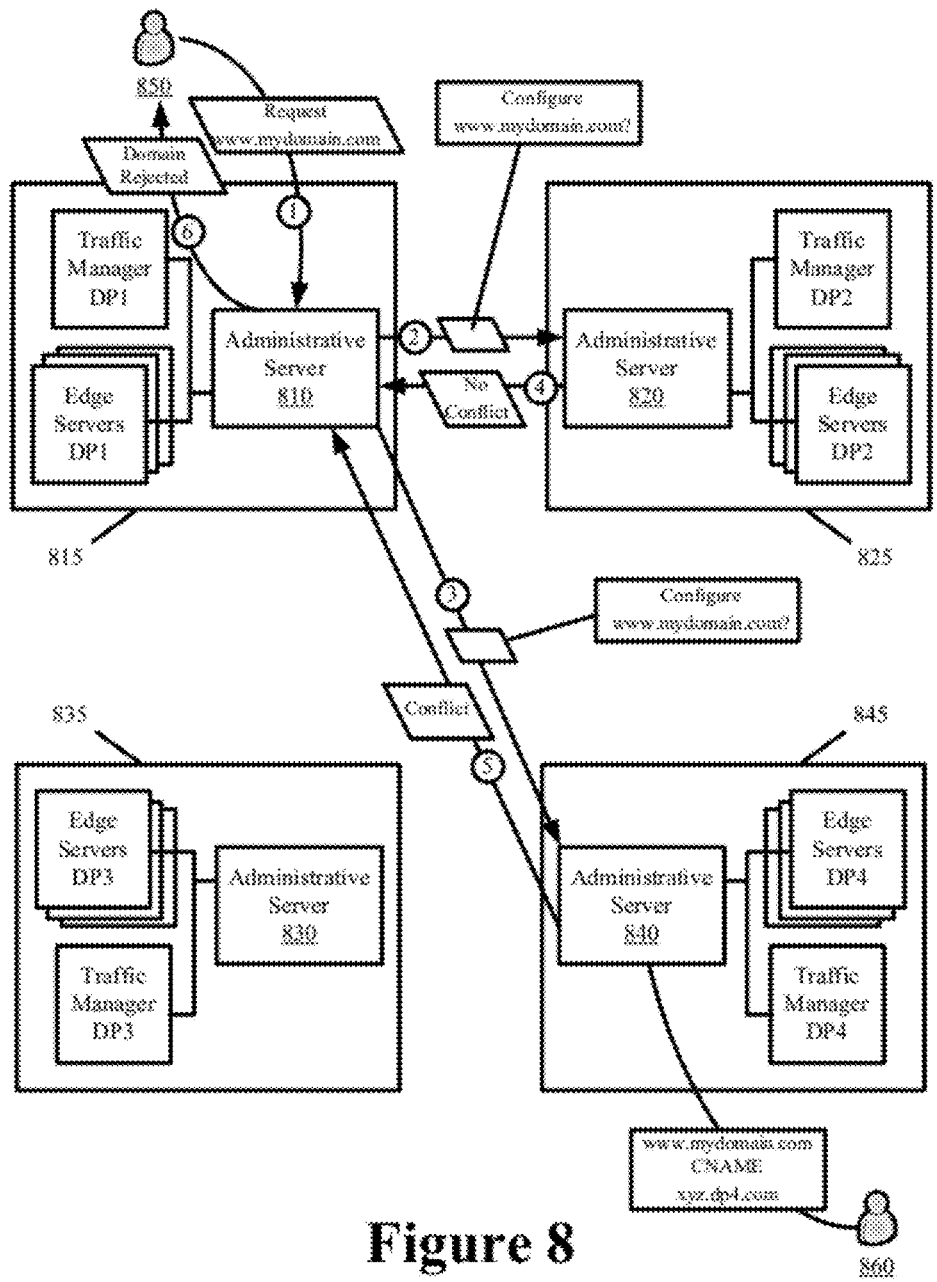
FIG. 8 conceptually illustrates authorizing the provisioning of a domain when operating in the framework of FIG. 7.

FIG. 8 conceptually illustrates authorizing the provisioning of a domain when operating in the framework of FIG. 7. This figure includes the administrative servers 810, 820, 830, and 840 of the distributed platforms 815, 825, 835, and 845. In this figure, a customer 850 of distributed platform 815 requests the domain "www.mydomain.com" be configured as an alias to identify assets of customer 850 that are to be deployed by distributed platform 815 to server capacity of the distributed platforms 825 and 845. The administrative server 810 receives the specified domain from the customer 850 and authorizes configuration of the domain by peering with the administrative server 820 of the distributed platform 825 and with the administrative server 840 of the distributed platform 845. Specifically, the administrative server 810 communicably couples with the administrative server 820 and the administrative server 840. Next, the administrative server 810 (1) submits to the administrative server 820 a request to configure the domain "www.mydomain.com" for use in identifying assets for the customer 850 that are to be deployed to server capacity of the distributed platform 825 and (2) submits to the administrative server 840 a request to configure the domain "www.mydomain.com" for use in identifying assets for the customer 850 that are to be deployed to server capacity of the distributed platform 845.

The administrative server 820 checks its internal database to determine that the specified domain has not yet been configured to identify assets for any customer in the distributed platform 825. The administrative server 820 then responds with a confirmation notification to the administrative server 810.

The administrative server 840 also checks its internal database and determines that the specified domain has already been configured for use in identifying assets of another customer 860 in the distributed platform 845. Due to the conflict, the administrative server 840 responds to the administrative server 810 with a rejection notification that prevents the administrative server 810 from configuring the "www.mydomain.com" domain to identify assets of the customer 850 in the distributed platform 845. As a result, the customer 850 is required to select a different domain.

In some embodiments of the framework of FIG. 7, each administrator server passively monitors the domains that other administrative servers have configured. In some such embodiments, a particular administrative server does not actively prevent the other administrative servers from configuring domains that conflict with those already configured by the particular administrative server. Instead, the particular administrative server disables the conflicting domains configured by other administrative servers from impacting the servers that are in the same distributed platform as the particular administrative server. This may include modifying routing functions of the traffic management servers of the distributed platform to redirect, ignore, or submit error messages to end users that request assets identified by the conflicting domain. Alternatively, each of the servers can intelligently monitor the configurations specified for it and as a result, ignore or disable a latter specified conflicting configuration from impacting operation of the server.

Figure 9:
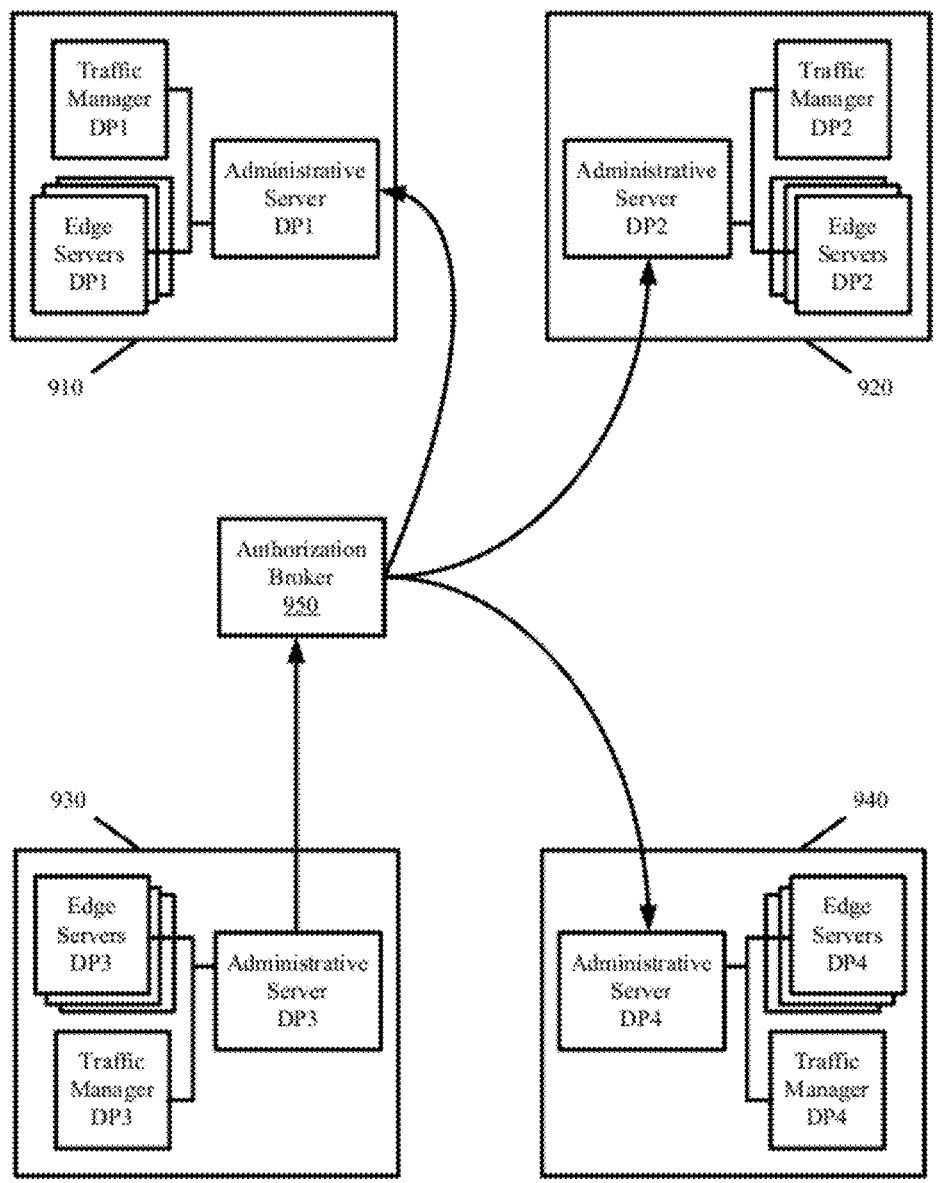
FIG. 9 presents a fourth conflict avoidance framework in accordance with some embodiments for ensuring unique identification of assets across the federation.

FIG. 9 presents a fourth conflict avoidance framework in accordance with some embodiments for ensuring unique identification of assets across the federation. The framework illustrates four distributed platforms 910, 920, 930, and 940 and the authorization broker 950. In this framework, each administrative server of the distributed platforms 910, 920, 930, and 940 maintains a database for tracking the domains that have been configured for use in identifying assets deployed to that distributed platform. The authorization broker 950 is provided to perform the distributed authorization on behalf of a requesting administrative server. In so doing, a requesting administrative server need only couple and send a single request to the authorization broker 950 that then fans out the request to each of the other administrative servers of the federation on behalf of the requesting administrative server. The authorization broker 950 then collects the responses from each of the other administrative servers in order to provide a single confirmation or rejection to the requesting administrative server. By using the authorization broker 950 to distribute the requests and process the results, the overhead for the administrative servers is reduced.

Many of the above-described processes and components are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor that executes instructions stored on computer readable media or that are obtained remotely over a network connection. Examples of computer readable media include, but are not limited to, CD-ROMs, flash drives, RAM chips, hard drives, EPROMs, etc. Furthermore, almost everywhere that a server is identified as a component of the embodied invention, it is understood that the server may be a single physical machine, or a cluster of multiple physical machines performing related functions, virtualized servers co-resident on a single physical machine, or various combinations of the above.

Figure 10:
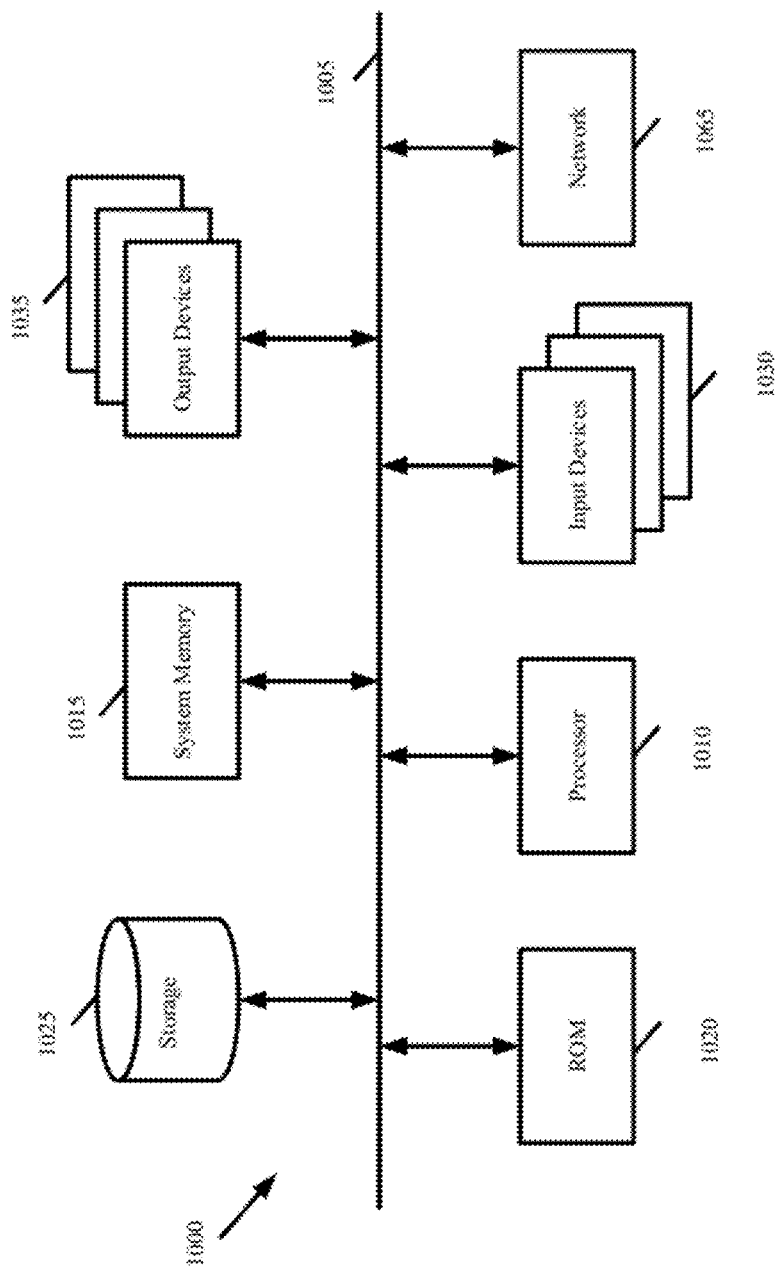
FIG. 10 illustrates a computer system or server with which some embodiments are implemented.

FIG. 10 illustrates a computer system or server with which some embodiments are implemented. Such a computer system includes various types of computer readable mediums and interfaces for various other types of computer readable mediums that implement the various frameworks described above (e.g., administrative servers, conflict avoidance server, and authorization broker, etc.). Computer system 1000 includes a bus 1005, a processor 1010, a system memory 1015, a read-only memory 1020, a permanent storage device 1025, input devices 1030, and output devices 1035.

The bus 1005 collectively represents all system, peripheral, and chipset buses that communicatively connect the numerous internal devices of the computer system 1000. For instance, the bus 1005 communicatively connects the processor 1010 with the read-only memory 1020, the system memory 1015, and the permanent storage device 1025. From these various memory units, the processor 1010 retrieves instructions to execute and data to process in order to execute the processes of the invention. The processor 1010 is a processing device such as a central processing unit, integrated circuit, graphical processing unit, etc.

The read-only-memory (ROM) 1020 stores static data and instructions that are needed by the processor 1010 and other modules of the computer system. The permanent storage device 1025, on the other hand, is a read-and-write memory device. This device is a non-volatile memory unit that stores instructions and data even when the computer system 1000 is off. Some embodiments of the invention use a mass-storage device (such as a magnetic or optical disk and its corresponding disk drive) as the permanent storage device 1025.

Other embodiments use a removable storage device (such as a flash drive) as the permanent storage device Like the permanent storage device 1025, the system memory 1015 is a read-and-write memory device. However, unlike storage device 1025, the system memory is a volatile read-and-write memory, such a random access memory (RAM). The system memory stores some of the instructions and data that the processor needs at runtime. In some embodiments, the processes are stored in the system memory 1015, the permanent storage device 1025, and/or the read-only memory 1020.

The bus 1005 also connects to the input and output devices 1030 and 1035. The input devices enable the user to communicate information and select commands to the computer system. The input devices 1030 include alphanumeric keypads (including physical keyboards and touchscreen keyboards), pointing devices (also called "cursor control devices"). The input devices 1030 also include audio input devices (e.g., microphones, MIDI musical instruments, etc.). The output devices 1035 display images generated by the computer system. The output devices include printers and display devices, such as cathode ray tubes (CRT) or liquid crystal displays (LCD).

Finally, as shown in FIG. 10, bus 1005 also couples computer 1000 to a network 1065 through a network adapter (not shown). In this manner, the computer can be a part of a network of computers (such as a local area network ("LAN"), a wide area network ("WAN"), or an Intranet, or a network of networks, such as the internet. For example, the computer 1000 may be communicably coupled through the network 1065 to an ingest server, mid-tier server, edge server, content provider streaming server, or end user device.

As mentioned above, the computer system 1000 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method for uniquely identifying assets in a federation, the federation comprising a plurality of distributed platforms, each distributed platform of the plurality of distributed platforms operating a different set of servers for serving at least some of said assets, the computer-implemented method comprising:

configuring at least one server that is operated by a first distributed platform of the plurality of distributed platforms to distribute an asset for a first customer of the first distributed platform;

providing a first domain name to identify the asset in the first distributed platform;

configuring a second domain name as an alias for the first domain name such that a request that requests the first customer's asset using the second domain name is aliased to request the first customer's asset using the first domain name, wherein the second domain name is specified by the first customer;

allocating server capacity from at least one server of the first distributed platform for use by a second distributed platform of the plurality of distributed platforms to distribute an asset for a second customer of the second distributed platform; and authorizing a third domain name that is specified by at least one of the second customer and the second distributed platform to ensure uniqueness to the second domain name.

2. The computer-implemented method of claim 1 further comprising preventing configuration of the third domain name when the authorization identifies that the third domain name is not unique to the second domain name.

3. The computer-implemented method of claim 2 further comprising configuring the third domain name as an alias for a fourth domain name when the authorization identifies that the third domain name is unique to the second domain name, and wherein a request that requests the second customer's asset using the third domain name is aliased to request the second customer's asset using the fourth domain name.

4. The computer-implemented method of claim 3, wherein the fourth domain name is a distributed platform specified domain name and the third domain name is a customer specified domain name.

5. The computer-implemented method of claim 3, wherein configuring the third domain name comprises modifying Domain Name System (DNS) operation for the federation by entering a CNAME record specifying the third domain name as an alias to the fourth domain name.

6. The computer-implemented method of claim 5, wherein modifying DNS operation for the federation comprises modifying an authoritative DNS server for at least one of the first distributed platform and the second distributed platform.

7. The computer-implemented method of claim 2 further comprising providing an interface for the second customer to specify a different domain name to identify the second customer's asset when the third domain is not unique to the second domain name.

8. The computer-implemented method of claim 1, wherein the first customer and the second customer are the same entity utilizing the first distributed platform to deliver said asset and utilizing the second distributed platform to deliver at least one of said asset or a different asset.

9. The computer-implemented method of claim 1, wherein the first customer is a different entity than the second customer.

10. The computer-implemented method of claim 1, wherein the third domain name is specified by the second customer by interfacing with the second distributed platform independent of the first distributed platform.

11. The computer-implemented method of claim 1, wherein at least one server that is operated by the second distributed platform is configured to distribute the second customer's asset in conjunction with the at least one server that is operated by the first distributed platform.

12. The computer-implemented method of claim 1, wherein the at least one server that is operated by the first distributed platform is used to distribute the second customer's asset without the second customer having interacted with the first distributed platform, and wherein the second customer interacts with the second distributed platform.

13. A method for uniquely identifying assets in a federation, the federation comprising a plurality of distributed platforms, each distributed platform of the plurality of distributed platforms operating a different set of servers for distributing at least some of said assets, the method comprising:

monitoring a plurality of custom specified addressing identifiers that are configured for requesting assets that are distributed by the set of servers operated by a first distributed platform of the plurality of distributed platforms;

allocating server capacity from at least one server that is operated by the first distributed platform to a second distributed platform of the plurality of distributed platforms for use by the second distributed platform to offload distribution of a particular asset from the second distributed platform to the first distributed platform;

receiving, from the second distributed platform, a custom specified addressing identifier for use in requesting the particular asset from the first distributed platform;

determining whether the custom specified addressing identifier for the particular asset conflicts with any of the monitored plurality of custom specified addressing identifiers; and configuring the custom specified addressing identifier for the particular asset in the first distributed platform when there is no conflict.

14. The method of claim 13, wherein each custom specified addressing identifier is an alias to a distributed platform specified addressing identifier.

15. The method of claim 14, wherein configuring the custom specified addressing identifier comprises modifying traffic management operation of the federation to facilitate routing of a request for the particular asset by converting from the custom specified addressing identifier that is specified for the particular asset to a distributed platform specified addressing identifier that is aliased to by the customer specified addressing identifier.

16. The method of claim 15, wherein modifying the traffic management operation of the federation comprises modifying DNS operation of at least one of the first and second distributed platforms.

17. The method of claim 15, wherein modifying the traffic management operation comprises configuring a DNS CNAME record to specify the custom specified addressing identifier for requesting the particular asset.

18. A computer-implemented method for uniquely identifying assets in a federation, the federation comprising a plurality of distributed platforms, each distributed platform of the plurality of distributed platforms operating a different set of servers for serving at least some of said assets, said computer-implemented method performed by a first distributed platform of the plurality of distributed platforms, said computer-implemented method comprising:

receiving a request to configure a custom addressing identifier for use in requesting an asset that a customer of the first distributed platform has deployed to the first disturbed platform for distribution;

acquiring server capacity from at least one server that is operated by a second distributed platform of the plurality of distributed platform to at least partially offload distribution of the asset from the first distributed platform to the second distributed platform;

authorizing the custom addressing identifier for use in requesting the asset from the at least one server that is operated by the second distributed platform, wherein said authorizing verifies that the custom addressing identifier for the asset does not conflict with any addressing identifier already configured for use in requesting an asset from a server that is operated by the second distributed platform; and initiating configuration of the custom addressing identifier when there is no conflict such that the asset of the first distributed platform customer may be requested from a server of the second distributed platform using the custom addressing identifier.

19. The computer-implemented method of claim 18 further comprising preventing configuration of the custom addressing identifier when there is conflict between the custom addressing identifier and at least one addressing identifier already configured for use in requesting an asset from a server that is operated by the second distributed platform.

20. The computer-implemented method of claim 19 further comprising providing an interface for the customer to specify an alternate custom specified identifier.

21. The computer-implemented method of claim 18, wherein the customer addressing identifier is an alias to a distributed platform addressing identifier that identifies the at least one server of the second distributed platform that is provisioned to distribute the asset.

22. The computer-implemented method of claim 21, wherein initiating configuration comprises defining a CNAME record to modify DNS operation of the second distributed platform such that a request for the asset specifying the custom specified addressing identifier is aliased to the distributed platform addressing identifier.

23. A non-transitory computer-readable storage medium with an executable program stored thereon, said program for uniquely identifying assets in a federation comprising a plurality of distributed platforms, each distributed platform of the plurality of distributed platforms operating a different set of servers for serving at least some of said assets, wherein said program instructs a microprocessor to perform sets of instructions for:

monitoring a plurality of CNAME records that each distributed platform of the plurality of distributed platforms has configured to address assets that are distributed by at least one server that is operated by that distributed platform, wherein each CNAME record of the plurality of CNAME records comprises a custom specified identifier that is an alias for a distributed platform defined identifier;

receiving a request to configure a particular custom specified identifier for use in requesting a particular asset that is provisioned for distribution by at least one server that is operated by a particular distributed platform of the plurality of distributed platforms;

verifying that the particular custom specified identifier does not conflict with any custom specified identifiers of the monitored plurality of CNAME records that are configured for addressing assets distributed by the set of servers that is operated by the particular distributed platform; and issuing authorization enabling configuration of the particular custom specified identifier as part of a CNAME record for addressing the particular asset when no conflict is identified; and issuing notification to prevent configuration of the particular custom specified identifier when the custom specified identifier is in conflict with a custom specified identifier of at least one CNAME record that is configured for addressing an asset that is distributed by at least one server that is operated by the particular distributed platform.

24. The non-transitory computer-readable medium of claim 23, wherein the set of instructions for issuing authorization enabling configuration comprises a set of instructions for authorizing entry of the CNAME record comprising the particular custom specified identifier to modify DNS operation of at least one of the federation and the first distributed platform.

25. The non-transitory computer-readable medium of claim 23, wherein the particular distributed platform is a first distributed platform of the plurality of distributed platforms, and wherein the program further comprises a set of instructions for receiving a request to configure the particular custom specified identifier for use in requesting an asset that is provisioned for distribution by at least one server that is operated by a second distributed platform of the plurality of distributed platforms, and wherein the set of instructions for verifying comprises a set of instructions for verifying that the custom specified identifier does not conflict with any custom specified identifiers of the monitored plurality of CNAME records that are configured for addressing assets distributed by at least one server that is operated by the second distributed platform.

* * * * *